United States Patent Office 3,706,100
Patented Dec. 12, 1972

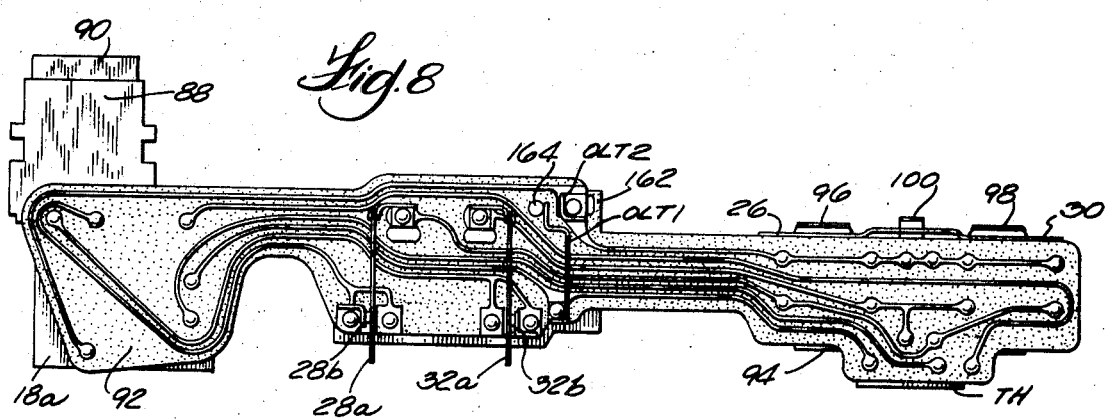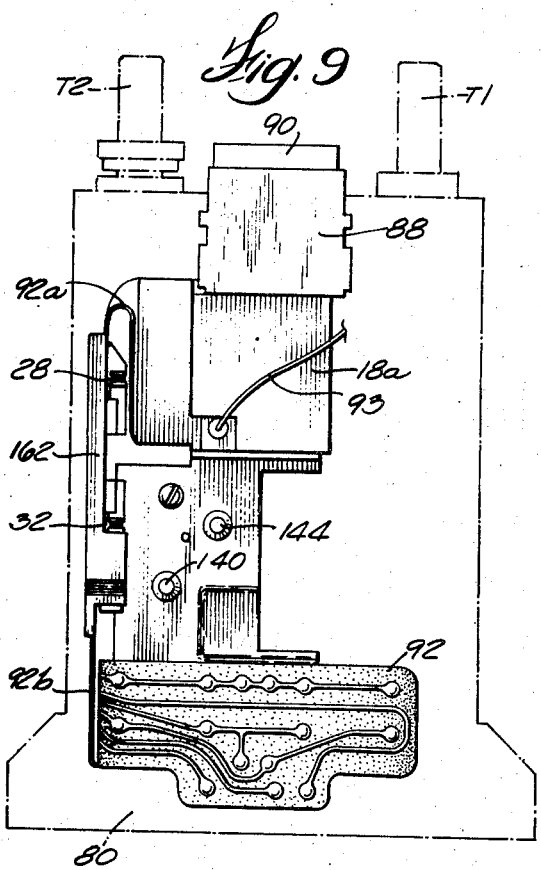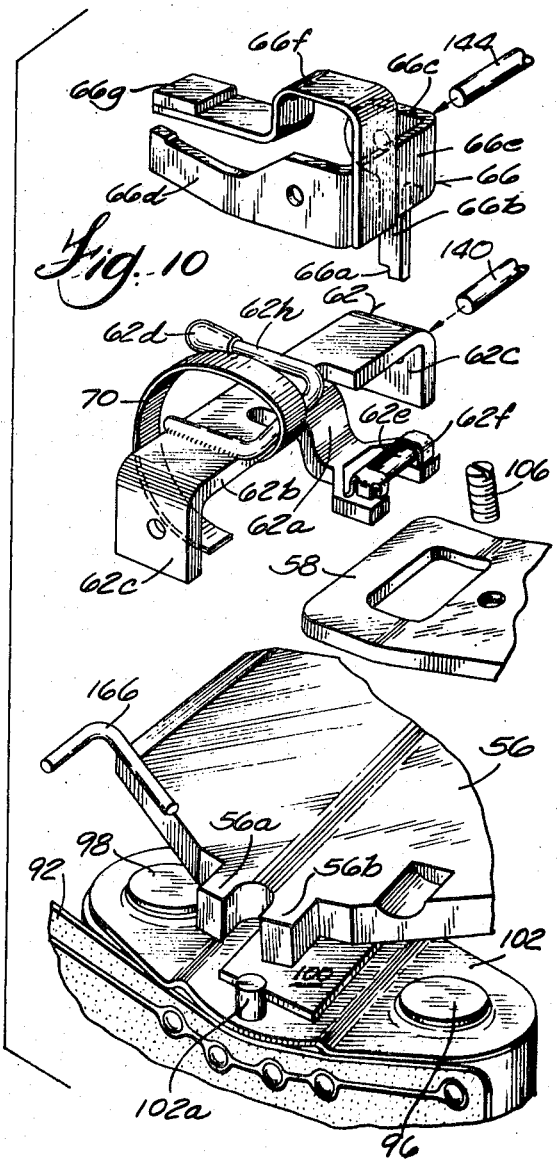

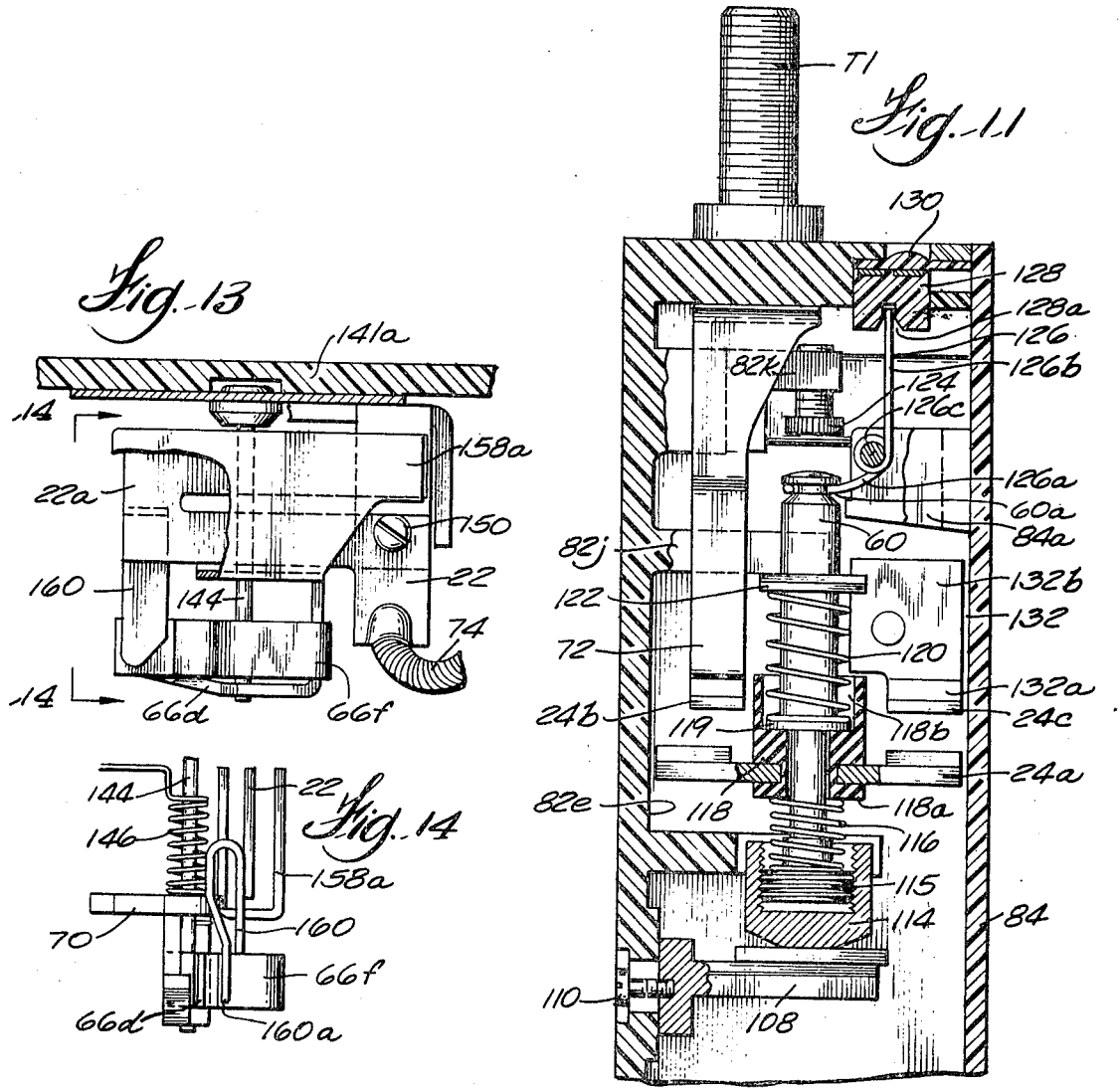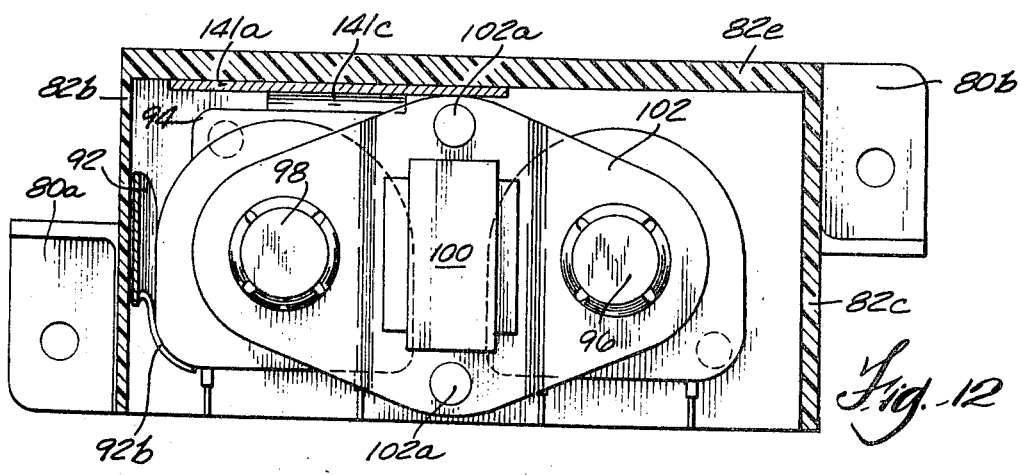

3,706,100
REMOTE CONTROL CIRCUIT BREAKER SYSTEM
Werner B. Halbeck, Cedarburg, John A. Quaal, Wauwatosa, Clyde F. Robbins, Milwaukee, and Walter L. Rutchik, Wauwatosa, Wis., assignors to Cutler-Hammer, Inc., Milwaukee, Wis.
Filed Jan. 19, 1972, Ser. No. 218,956
Int. Cl. H02b 1/00
U.S. Cl. 317—58
10 Claims

ABSTRACT OF THE DISCLOSURE

A remote control circuit breaker system in which an electronic logic unit is built into a main electromagnetically operated circuit breaker to act as the controlling interface between the latter and a remotely located pilot control-circuit breaker unit. In addition to directing main circuit breaker operation to provide closing and opening of the same in correspondence with the operation of the pilot unit, the logic unit responds on overload trip open of the main circuit breaker to subject the pilot unit to a controlled value of simulated overload current as will cause the latter to trip open and afford indication of the occurrence of overload tripping in the main circuit breaker. The logic unit also affords coordination of a plurality of such circuit breakers in a multiphase A.C. system so that all will be responsive to the operation of a single remote pilot unit, and will also trip open following overload response of any thereof. Further the logic unit automatically functions in the event of a fault occurring in the pilot unit or the line connecting it with the main breaker to limit the value of fault to a non-destructive value, and prevent repeated circuit breaker cycling in the event the pilot breaker fails to open. The main circuit breaker uses double-break contacts and permanent magnet latching to improve its arc rupture withstandability and eliminate the necessity of continuous energization of its electromagnetic operating coils. The overload trip mechanism in the main circuit breaker uses a low friction latch, and together with ambient temperature compensation in the bimetal latch release enhances the trip point precision.

---

Features of the invention disclosed in the present application are disclosed and claimed in co-pending application Ser. No. 218,955, W. B. Halbeck et al. inventors, filed Jan. 19, 1972, and assigned to the assignee of the present application.

BACKGROUND OF THE INVENTION

In the newer designs of large jet aircraft, remote controlled circuit breaker systems are being used to avoid the necessity of running long lengths of heavy and relatively expensive power cable up to the flight deck. As presently constituted, these circuit breaker systems employ electromagnetically operated main circuit breakers located near the electrical generators or load centers. Additionally, they use small pilot control circuit breaker units located in the flight deck for directing the normal closing and opening of an associated circuit breaker or breakers, and providing by trip open indication of overload trip opening of such associated main circuit breakers.

Remote controlled circuit breaker systems of the aforementioned type are often used to control 115 volt, 400 Hz. A.C. power, both single and three phase, found in modern large jet aircraft. Such aircraft are also often provided with auxiliary D.C. power at 28 volts. It is desirable that such remote control circuit breaker systems be capable of performing with either A.C. or D.C. control power derived from such main and auxiliary power sources. It is also desirable in the event of total power failure that the main circuit breakers will remain in their last attained operating positions during power outage, and during following restoration of power, until directed by operation of their associated pilot control-circuit breaker unit into the other operating position. Use of a single electrical control line between a pilot control-circuit breaker unit and a main circuit is desirable, and control of all three main breakers for a three phase A.C. load circuit by a single pilot control-circuit breaker is another desired capability.

Presently used remote control circuit breaker systems are often handicapped by insufficient arc rupture capability, relatively low mechanical operating life, and high weight and large size for their ratings. Some are incapable of operation on both A.C. and D.C. power. Others are subject to burn-out or destructive mechanical cycling in the event the pilot control-circuit breaker or its connecting line with the main circuit breaker has a fault.

THE OBJECTS OF THE INVENTION

It is the primary object of the present invention to provide an improved form of remote control circuit breaker system of the aforementioned type which is particularly suitable for use in aircraft.

A further object of the invention is to promote a system of the aforementioned type which employs an improved electronic logic means built into each main circuit breaker for directing the operation of such circuit breaker in correspondence with the manual operation of a remotely located pilot control-circuit breaker unit and for causing opening of the latter when its associated main circuit breaker trips open under overload.

Another object is to provide a logic unit of the aforementioned type which is characterized by affording automatic current limiting action in the event a fault occurs in the pilot control circuit breaker unit or in the line connecting it with the main circuit breaker.

A still further object is to provide an improved electromagnetic operating and electrothermal trip mechanism in the main circuit breakers of the aforementioned system.

A more particular object is to provide a main circuit breaker of the aforementioned type of improved electrical rating and arc rupture withstandability for its physical size and weight.

Other objects and advantages of the invention will hereinafter appear.

BRIEF DESCRIPTION OF THE DRAWING FIGURES

Figure 5:
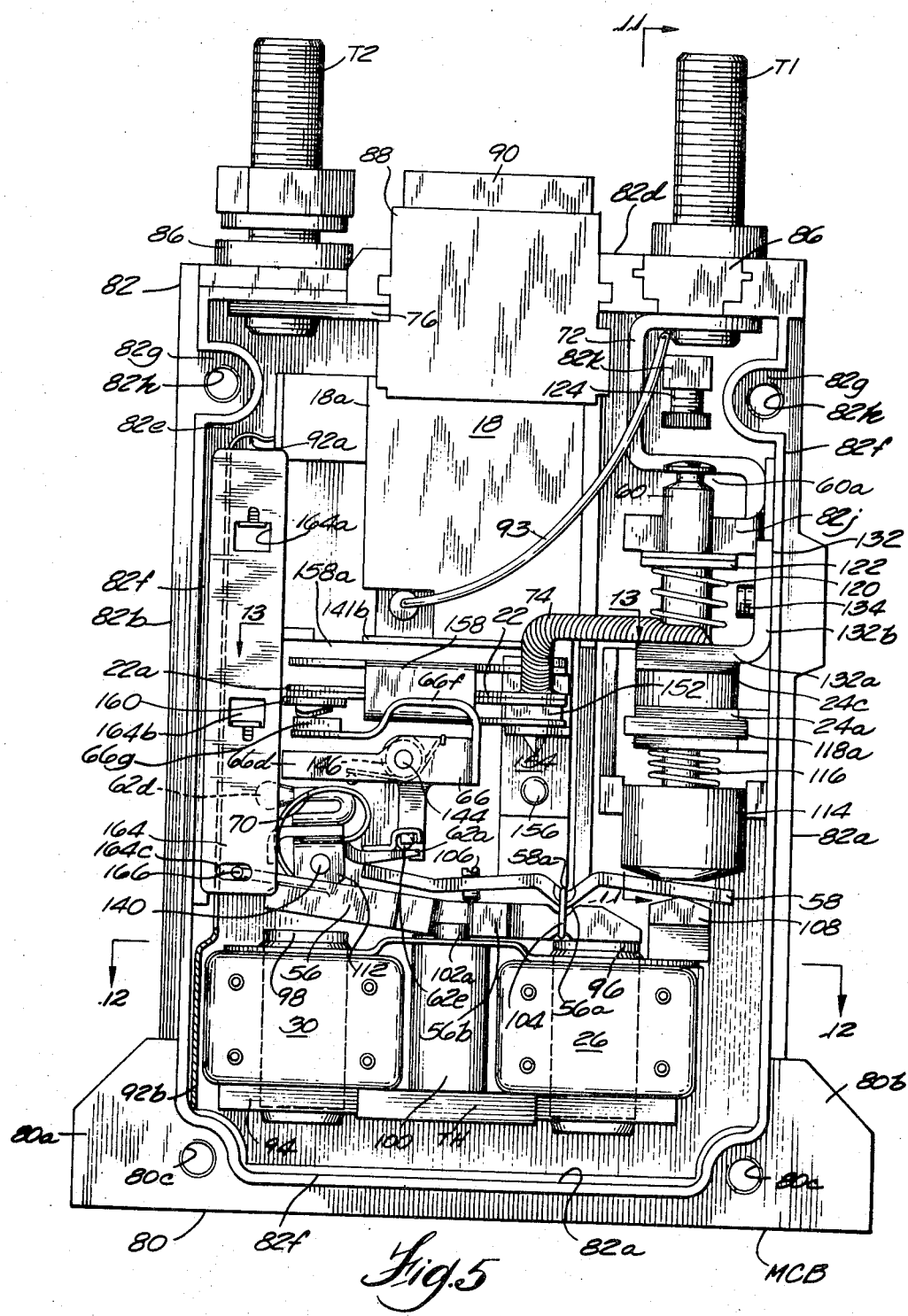
FIGS. 5, 6 and 7 are views in front elevation to enlarged scale showing the details of the main circuit breaker in its open, closed and overload trip positions.

FIG. 8 is a view showing the details of a printed circuit wiring harness and its connections with the logic module and portions of the main circuit breaker;

FIG. 9 is a view showing the actual arrangement of such wiring harness within the main circuit breaker case;

FIG. 10 is an exploded perspective view showing details of the latch mechanism and armature mounting in the main circuit breaker;

FIG. 11 is a partial sectional view taken along the line 11—11 in FIG. 5 showing details of main contact and a position indicator in the main circuit breaker;

FIG. 12 is a sectional view taken along the line 12—12 or FIG. 5 showing portions of the electromagnetic operating mechanism;

Figure 15:
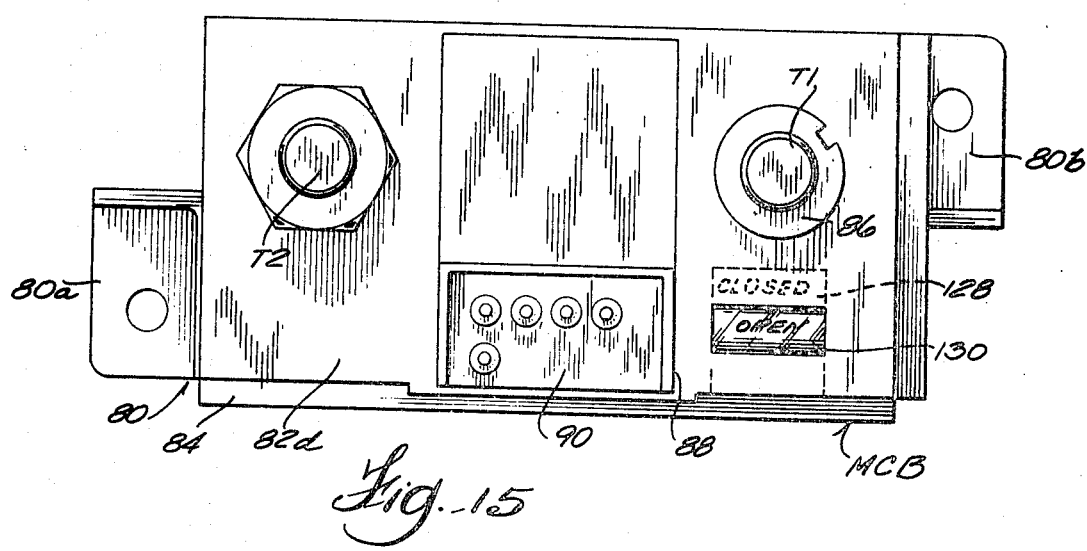

FIG. 13 is a sectional view taken along the line 13—13 of FIG. 5 showing details of the bimetallic thermal elements;

FIG. 14 is a view taken along the line 14—14 of FIG. 13;

FIG. 15 is a top end view to reduced scale of the main circuit breaker; and

Figure 16:
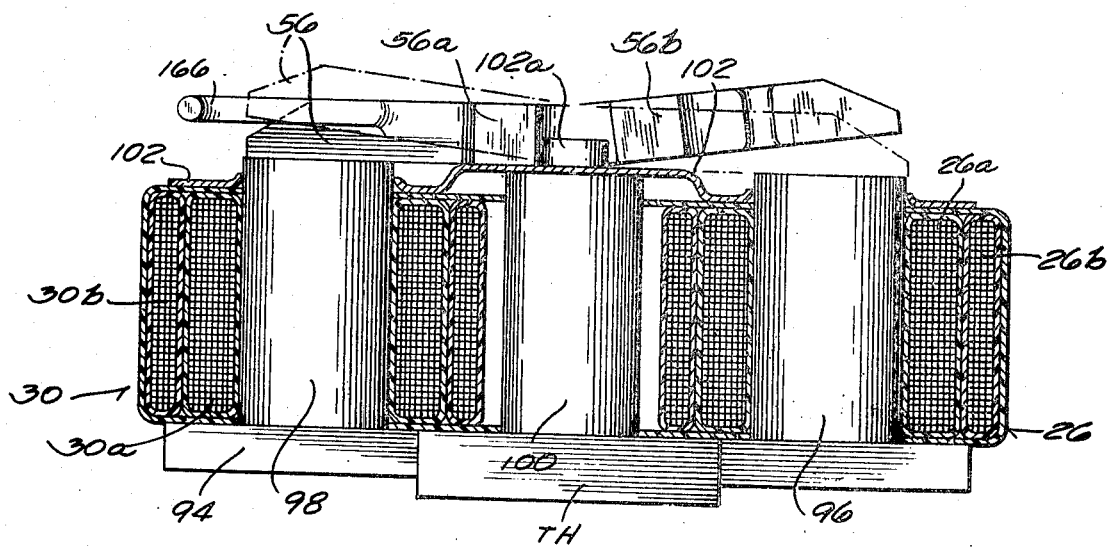

FIG. 16 is a view in elevational cross section showing the details of the electromagnetically operating mechanism in the main circuit breaker.

Figure 1:
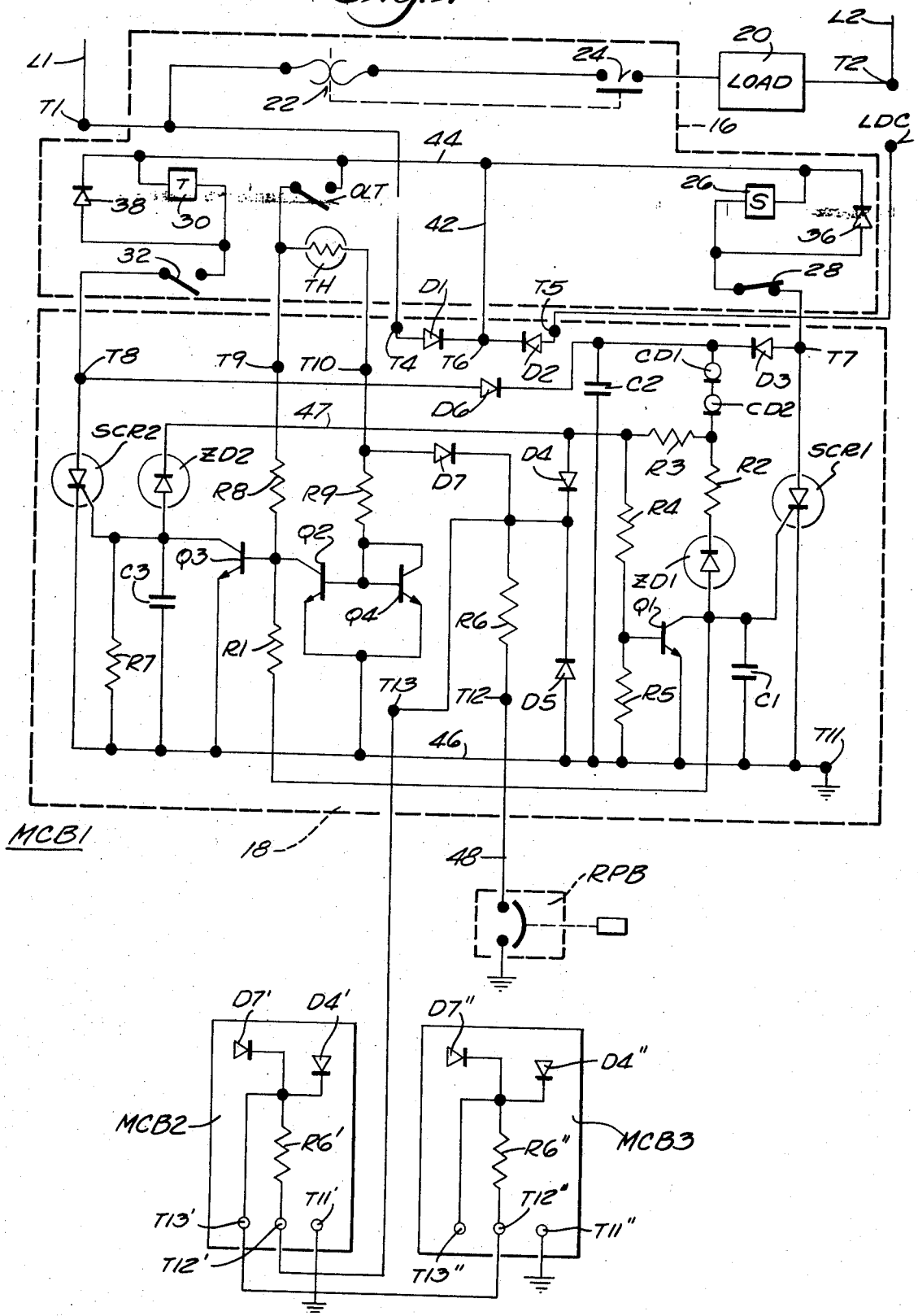
FIG. 1 is a diagrammatic showing of a complete remote control circuit breaker system constructed in accordance with the invention.

Referring to FIG. 1, it shows a complete remote control circuit breaker system that can be used in a large aircraft having a main three-phase power supply, and an auxiliary 28 volt D.C. power supply. The system basically comprises a main circuit breaker MCB1 having an electro-mechanical-thermal breaker unit 16, an electronic logic unit 18, a remote pilot circuit breaker RPB, and second and third main circuit breaker units MCB2 and MCB3 like breaker MCB1. In a preferred form, the pilot circuit breaker RPB would be like that disclosed in the Ingwerson Pat. No. 2,943,172, issued June 28, 1960, and when used in an aircraft would be located in the flight deck for operation and monitoring by flight personnel.

Breaker unit 16 has a terminal T1 to which one line L1 of the three phase supply is connected, and a load terminal T2 connected in series with a load 20 to a second line L2 of the A.C. supply. Terminal T1 has electrical connection in series with a bimetal thermal element 22 and main load contacts 24 to load terminal T2, and a direct electrical connection to terminal T4 of logic unit 18. Breaker unit 16 has an electromagnetic "set" coil 26 and associated cutthroat contacts 28, an electromagnetic "trip" coil 30 and associated cutthroat contacts 32, and overload trip contacts OLT. Diodes 36 and 38 are connected across coils 26 and 30 respectively, and a thermistor TH which will be later described in connection with logic unit 18 is mounted in breaker unit 16 as will hereinafter be described in connection with the detailed description of the construction of the main circuit breaker MCB1. The electrical hook-up of coils 26 and 30, contacts 28, 32 and OLT, and thermistor TH will follow in connection with the details of logic unit 18.

THE LOGIC UNIT

Logic unit 18 provides an operating interface between the main and/or the auxiliary power supplies, and the electro-mechanical-electrothermal mechanisms in circuit breaker 16 and the pilot circuit breaker RPB. It responds to manual opening and closing of pilot breaker RPB to cause operation of circuit breaker 16 to effect corresponding opening and closing of its main contacts 24. Further, it functions on overload trip-open of main contacts 24 and resulting closing of overload trip contacts OLT to send a controlled, simulated overload current through pilot circuit breaker RPB to effect overload trip-open of the latter. When inter-connected with corresponding logic units in two other like MCB units, such as might be used in an aircraft three-phase A.C. power supply, the aforementioned closing overload trip contacts OLT will effect following opening of the main contacts 24 in such other main circuit breaker units regardless of the response of breaker RPB.

Unit 18 comprises power input terminals T4 and T5 which have connection to terminal T1 of breaker unit 16 and auxiliary D.C. power line LDC respectively. Terminal T4 is connected in series with a diode D1 to a terminal T6, and terminal T5 is connected in series with a diode D2 to terminal T6. Diodes D1 and D2 are in opposing conducting relation to afford isolation between main and auxiliary power supplies when simultaneously connected to terminals T4 and T5. Diodes D1 and D2 also provide rectification of A.C. current supplied from line L1.

Terminal T6 is connected through lines 42 and 44 and in series with "set" coil 26 and cutthroat contacts 28 in breaker 16 to terminal T7, and in another branch from line 44 in series with "trip" coil 30 and cutthroat contacts 32 in breaker 16 to terminal T8. Terminal T6 is additionally connected through lines 42 and 44 and in series with overload trip contacts OLT to terminal T9 in one branch, and from contacts OLT in another branch in series with a thermistor TH to terminal T10. Diodes 36 and 38 are connected across the coils 26 and 30 respectively in the reverse conducting relation shown to provide "free wheeling" current conduction through their coils when the logic unit is operating on alternating current.

Terminal T7 is connected through the main conducting path of a silicon controlled rectifier SCR1 to a ground line 46 which has connection with a ground terminal T11. The control eelctrode of SCR1 is connected to the high potential terminal of a capacitor C1, the anode of a Zener diode ZD1, the collector of a transistor Q1, and in series with a resistor R1 to the collector of a transistor Q2 and base of a transistor Q3. Terminal T7 is also connected in series with a diode D3, two current regulating diodes CD1 and CD2 and a resistor R2 to the cathode of Zener diode ZD1. The point common between diode CD2 and resistor R2 is connected in series with a resistor R3, and in one branch additionally in series with resistor R4 and R5 to line 46, and in another branch through line 47 to the cathode of a Zener diode ZD2 and the anode of a diode D4. The point common between resistors R4 and R5 is connected to the base of transistor Q1 and provides a voltage divider connection for the latter. The cathode of diode D4 is connected in series with a resistor R6 to a terminal T12. A diode D5 is connected between line 46 and the point common between resistor R6 and diode D4 in opposed conducting relation to the latter.

Terminal T8 is connected in series with the main conducting path of an SCR2 to ground ine 46, and terminal T8 is also connected in series with a diode D6 to the point common between the cathode of diode D3, diode CD1 and the high potential terminal of a capacitor C2 which is connected at its low potential plate to line 46.

SCR2 has its control electrode connected to the anode of Zener diode ZD2, the collector of transistor Q3 which has its emitter connected to line 46, the high potential terminal of a capacitor C3 and the upper end of a resistor R7. Capacitor C3 and resistor R7 have their lower ends connected to line 46.

Terminal T9 is connected in series with a resistor R8 to the point common between the collector of transistor Q2, the base of transistor Q3 and the upper end of resistor R1. Terminal T10 is connected in one branch in series with a resistor R9 to. the collector of a transistor Q4, and in a second branch in series with a diode D7 to the point common between the cathode of diode D4 and the resistor R6. The last mentioned common point is also connected to a terminal T13. The emitter of transistors Q2, Q3 and Q4 are all connected to lie 46.

Terminal T12 of logic unit 18 is connected through a line 48 to one terminal of remote pilot breaker RPB which also has connection through its other terminal to the system ground. Terminal T13, when used in a three-phase A.C. power system, would be connected to terminal T12' of the logic unit 18 of a second main circuit breaker unit MCB2, and terminal T13' of the latter would be connected to terminal T12' of the logic unit 18 of a third main circuit breaker MCB3. As will hereinafter be described, manual closing and opening of RPB will effect corresponding opening and closing of main contacts in all three main breakers, and overload tripping in any one thereof will cause RPB to trip open and thereby effect opening of all of the other main breakers.

Capacitor C2 in conjunction with either of the coils 26 and 30 acts as a dv/dt suppression network for SCR1 and SCR2.

THE SCHEMATIC ARRANGEMENT OF THE MAIN CIRCUIT BREAKER

Figure 4:
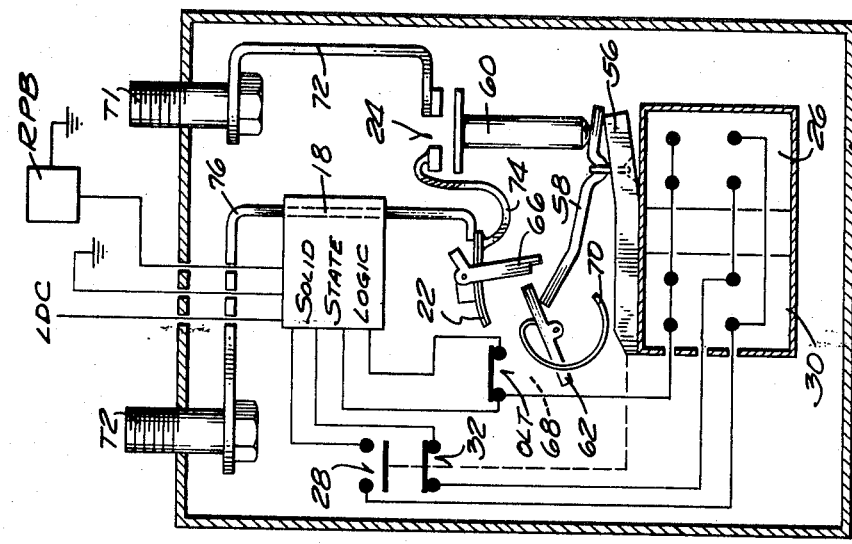
FIGS. 2, 3 and 4 are schematic showings of the main circuit breakers used in the system in its closed, open and overload trip positions, respectively.
Figure 3:
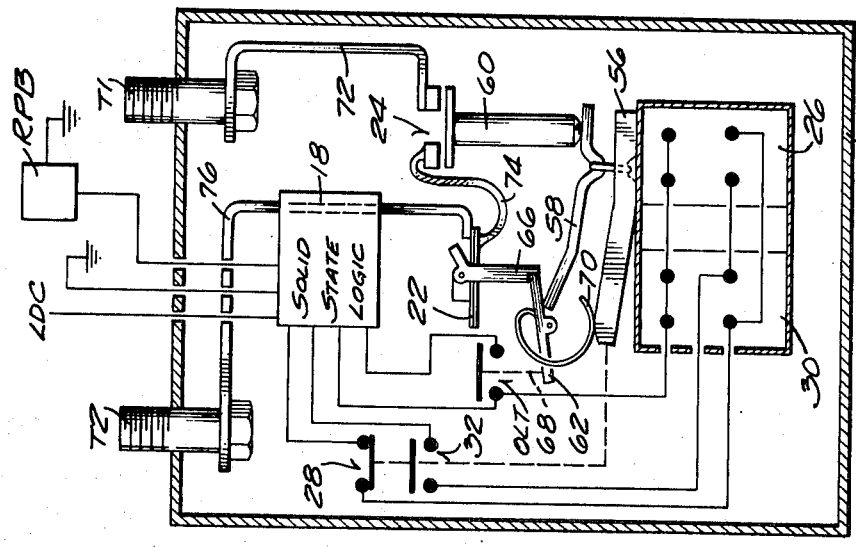
Figure 2:
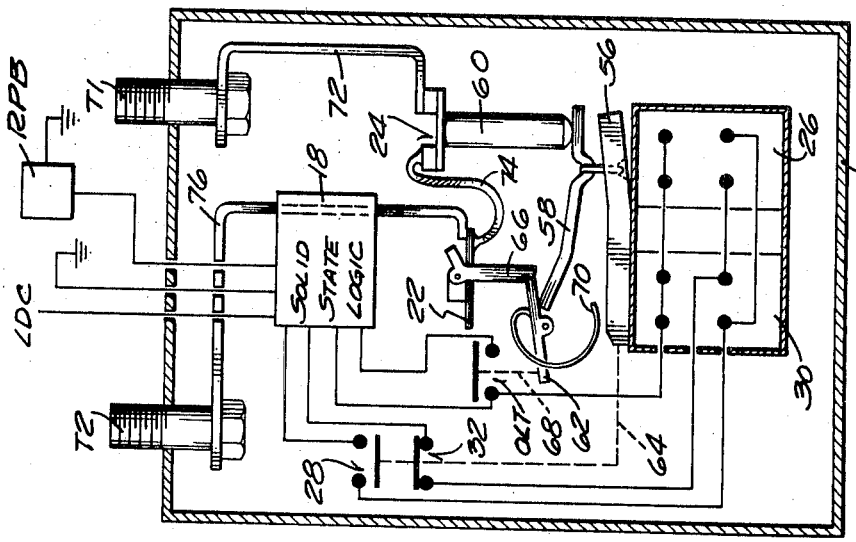

To facilitate the description of operation of the complete remote control circuit breaker system, the physical arrangement of the system has been schematically shown in FIGS. 2, 3 and 4 to illustrate the three operating conditions of the mechanical parts of breaker unit 16. The "set" and "trip" coils 26 and 30 when alternately energized, as hereinafter described, move an armature assembly comprising a pivoted armature 56 and a superimposed lever 58 pivotally mounted on armature 56. Lever 58 adjacent its right-hand end engages the operating plunger 60 secured to movable contactor 24a of main contacts 24 and adjacent its left end engages with a pivoted latch bar 62. Armature 56 also has a mechanical connection, as depicted at 64, to effect simultaneous opening and closing of the cutthroat contacts 28 and 32.

A latch 66 is pivotally mounted adjacent its upper end to bimetal element 22 and adjacent its lower end has a notched shoulder to normally engage and hold latch bar 62 in the operating position depicted in FIGS. 2 and 3. Adjacent its left-hand end latch bar has mechanical connection, as depicted at 68, to the movable contactor of contacts OLT. It also has attached thereto a generally C-shaped spring 70 which engages with armature 56 and is partially compressed when the breaker unit is in the operating condition depicted in FIG. 3.

Terminal T1 is connected through a bus 72 to one of the stationary contacts of main contact 24. The other main stationary contact is connected through a flexible conductor 74 to bimetal element 22 which is attached at its right-hand end to a bus 76 which has connection with terminal T2. The electrical connections between coils 26 and 30, and contacts 28 and 32 OLT and logic unit 18 have heretofore been described in connection with FIG. 1.

DESCRIPTION OF OPERATION OF THE REMOTE CONTROL CIRCUIT BREAKER SYSTEM

The operation will be described with reference to FIGS. 1 to 4. First considering FIGS. 1 and 3, they show the operating condition provided when remote pilot breaker RPB is in its open position shown in FIG. 1. In this operating condition, cutthroat contacts 28 are closed, cutthroat contacts 32 are open and overload trip contacts OLT are open. Coil 30 is completely denergized due to contacts 32 being open. A small amount of current can flow from either line L1, or line LDC through diode D1 or D2, lines 42 to 44, coil 26, contacts 38, diode D3, diodes CD1 and CD2, resistors R3, R4 and R5 to ground, but such current is insufficient to cause contacts 28 to open under the influence of coil 26. The base of transistor Q1 due to its connection to the junction of resistors R4 and R5 will be at a potential turning Q1 fully "on," thereby clamping the control electrode of SCR1 essentially to ground potential to prevent conduction of the latter. Any current that flows down through R2 and Zener diode ZD1 is then bypassed through Q1 thereby preventing capacitor C1 from charging. Consequently, resistor R1 clamps the base of Q3 to the low potential of Q1 and Q3 is turned "off." Consequently, current will flow through Zener diode ZD2 into the control electrode of SCR2 to render SCR2 conducting. It will be seen that with contacts OLT open transistors Q2 and Q4 will both be "off."

Now let it be assume that remote pilot breaker RPB is closed to connect terminal T12 to ground. This pulls the anode of diode D4 and line 47 down to approximately 0.5 volt above ground potential, and consequently the potential of the base of transistor Q1 will be reduced to a value turning transistor Q1 "off." Charging current then flows through Zener diode ZD1 into capacitor C1, and the control electrode of SCR1. SCR1 then conducts, and a current pulse flows through "set" coil 26 and contacts 28 and SCR1 to ground. Energization of coil 26 results and causes armature 56 to operate from the position depicted of FIG. 3 to that shown in FIG. 2 wherein it effects closure of main contacts 24 to connect the load across lines L1 and L2, and opening of cutthroat contacts 28 and closure of cutthroat contacts 32.

The reduced potential at line 47 also halts current flow through ZD2, and the turn "off" of transistor Q1 also drives the base of transistor Q3 and its potential quickly rises to a value that turns "on" the latter. Consequently, any residual charge in capacitor C3 is immediately bypassed through Q3 to ground. Thus SCR2 is quickly disabled before its associated cutthroat contacts 32 close.

With cutthroat contacts 28 open, "set" coil 26 will be deenergized, and after cutthroat contacts 32 close, a small value of current will flow into terminal T8 through diode D6, diodes CD1 and CD2, resistor R3, diode D4 and resistor R6 to ground. But the potential at the anode of diode D4 and line 47 will be held at the aforementioned value by the closed RPB which holds transistor Q1 and SCR1 "off."

If RPB is subsequently manually opened, it will be seen that the anode of diode D4 and also the base of transistor Q1 will rise to a value at which transistor Q1 is again turned fully "on." As a result thereof, the base of transistor Q is again clamped to approximately ground potential thereby turning the latter fully "off." Consequently, with the increased potential at line 47, current will again flow through Zener diode ZD2 and into capacitor C3. When the potential of capacitor C3 reaches a given potential SCR2 conducts, and a substantial current pulse flows through coil 30, the then closed cutthroat contacts 32 and SCR2 to ground. As a result, cutthroat contacts 32 open to deenergize coil 30, and cutthroat contacts 28 reclose. Because transistor Q1 is "on" the control electrode of SCR1 is clamped to near ground potential and thus cannot conduct even though the anode is connected through the reclosed contact 28 to high potential. The momentary operation of trip coil 30, of course, in addition, operates the armature assembly from the operating condition shown in FIG. 2 back to that shown in FIG. 3.

Overload trip operation of the circuit breaker system will now be described. Let it be assumed that remote pilot breaker RPB is closed, that main contacts 24 are closed and that the armature assembly and cutthroat contacts 28 and 32 are in the positions depicted in FIG. 2. Now let it be assumed that bimetal element 22 is subjected to a high overload current flowing therethrough. Consequently, element 22 will warp downwardly as shown in FIG. 4 and cause latch 66 to pivot counterclockwise and disengage from latch arm 62. Lever 58 will then be freed to pivot clockwise under the downward bias of push rod 60 in opening main contacts 24. In so pivoting clockwise, lever 58 causes the then unlatched latch arm 62 to pivot counterclockwise to the position depicted in FIG. 4, which in turn causes overload trip contacts OLT to close.

With contacts OLT closed, primary current will flow through diode D7, resistor R6 and the thermally responsive element of the remote pilot breaker to ground, and current will also flow in one branch through resistors R8 and the base emitter circuit of Q3 to ground, and in a second branch through resistor R9, into the collector and base-emitter circuit of transistor Q4 and into the base-emitter circuit of transistor Q2.

The voltage drop across thermistor TH causes the voltage drop across resistor R8 to be greater than that across resistor R9. Thus, more current is initially available at the collector of transistor Q2 than at the collector of transistor Q4. Consequently, transistor Q3 is held "on" thereby clamping the control electrode of SCR2 to ground. After a very short period of time, on the order of 50 milliseconds, the thermal element in remote pilot breaker RPB will open and current flow will then cease through thermistor TH. The voltages across resistors R8 and R9 become equal, and since there is no difference in the values of currents flowing in the collector-emitter circuits of the transistors Q2 and Q4. There will no longer be excess current sufficient to hold Q3 "on." Transistor Q3 turns "off" allowing capacitor C3 to charge by current flowing through Zener diode ZD2 from terminal T8, etc. As a result SCR2 turns on thereby causing a substantial current pulse to flow through "trip" coil 30, the then closed cutthroat contact 32 and SCR1 to ground. Contacts 32 therefore open and contacts 28 reclose as aforedescribed in connection with the manual opening of remote pilot circuit breaker RPB. Consequently, the armature assembly will change position from that shown in FIG. 4 to that shown in FIG. 3.

Armature 56 in pivoting clockwise back to the position shown in FIG. 3 engages the C-shaped spring 70 and thereby pivots latch arm 62 clockwise. When bimetal element 22 has returned to its normal, unwarped position, latch 66 will engage its notched shoulder again with arm 62 to latch it in the position depicted in FIGS. 2 and 3. Main contacts 24 will be open and the cutthroat contacts 28 and 32 and overload contacts OLT will be then back in their respective positions shown in FIGS. 1 and 3. The remote control circuit breaker system will then be in the same condition as that afforded following manual opening of pilot circuit breaker RPB.

It will be appreciated that MCB1 cannot be reset to connect the load to the power lines, if latch 66 has not re-engaged with bimetal element 22 as shown in FIG. 2. If, under the latter conditions, the armature assembly moves to the position depicted in FIG. 2 as a result of closure of RPB, the OLT contacts will immediately assume the closed position shown in FIG. 4, and the overload trip action just described will again occur.

The transistors Q2 and Q4 immediately following overload trip act as a remote differential detector and insure that Q3 is turned "on," and held "on" until remote pilot breaker RPB opens. This insures that SCR2 will not conduct and thus prevents energization of coil 30 and reopening of the OLT contacts until RPB has opened.

In the event of failure of both the main A.C. power supply and the auxiliary D.C. power supply, main circuit breaker MCB1 to MCB3 will remain in their operating conditions existing at the time of complete power failure. Moreover, upon restoration of one or both of such power supplies they will remain in such operating conditions until remote pilot switch RPB is subsequently operated to another operating position. It will be apparent that the armature assembly of a MCB circuit breaker cannot be shifted from one to the other of the positions shown in FIGS. 2 and 3 without energization of one of the electromagnetic coils 26 and 30. Further, logic unit 18 requires the presence of an A.C. voltage at its terminal T4, or D.C. voltage at its terminal T7, in order to function and afford energization of one or the other of the coils 26 and 30, in response to the manual opening and closing of remote pilot circuit breaker RPB. It will also be apparent that the state of logic unit 18 will not change upon restoration of power from that existing at the time of power loss until pilot circuit breaker RPB is operated to its other operating condition, or an overload trip operation occurs in one of the circuit breakers MCB1 to MCB2.

Thermistor TH, in addition to providing the aforedescribed transition current comparator control function following overload trip closing of contact OLT, also functions to limit the current flowing through line 48 and pilot control-breaker RPB in the evente a fault occurs. If a fault occurs in line 48 or breaker RPB, the higher current flowing through thermistor TH will increase its temperature and when 80° C. is reached a very marked increase in ohmic resistance of TH occurs which thereafter limits the current flow therethrough. The logic package and line 48 will thus be protected against possible heat fusion damage that might otherwise occur if run-away heating were permitted.

THREE-PHASE INTERLOCK OPERATION

With main circuit breakers MCB1, MCB2 and MCB3, and remote pilot breaker RPB electrically interconnected as shown in FIG. 1, closing and opening of RPB will result in following corresponding closing and opening of the main contacts 24 in each of the main circuit breakers. It will be apparent from FIG. 1 that when RPB is closed the upper ends of corresponding resistors R6, R6' and R6" of the main breakers will be brought down to slightly above ground potential which causes the respective logic circuits in each of the main breakers to function as hereinbefore described and effect closing of the main load contacts 24 in each main circuit breaker. When RPB is subsequently opened, the upper ends of the resistors R6, R6' and R6" shift sharply above ground potential which causes the logic units in each main breaker to function to open its associated load contacts 24.

It is also a feature of this invention that overload trip action of any main breaker will result in opening of the other main circuit breakers, whether or not the remote pilot circuit breaker RPB opens. Assume for example that there has been an overload sensed by main circuit breaker MCB3 and its OLT contacts close. As a controlled value of current will flow through resistor R6" of that breaker, and through resistors R6' and R6 of main breakers MCB2 and MCB1. This shifts the potential at the upper ends of the resistors R6, R6' and R6" in the main circuit breakers, and as aforedescribed this results in opening of the main load contacts 24 in each of the breakers, MCB1, MCB2. It will be apparent that overload response in either of the other main circuit breakers MCB1 and MCB2 will provide similar opening of the load contacts in the other two main circuit breakers.

Normally on overload response in any of the main circuit breakers, there would be an increased circuit flow through remote pilot breaker RPB, and the latter would trip open to provide indication at the flight deck of opening of the main circuit breakers. However, as can be seen from the foregoing, that overload response of the system to provide opening of all main circuit breakers is in no way dependent upon pilot breaker RPB opening.

CONSTRUCTION DETAILS OF THE MAIN CIRCUIT BREAKER

FIGS. 5 to 15 show a preferred form of construction for a main circuit breaker MCB inclusive of the circuit breaker unit 16 and logic unit 18. More particularly MCB comprises a die case metal base 80, a molded insulating case 82, and an insulating cover 84. The base 80 is provided with oppositely disposed mounting flanges 80a and 80b which have clearance openings therein to receive mounting screws or bolts. Base 80 is also provided with a front opening recess in which the case 82 is seated and bonded by a suitable epoxy type cement.

The case 82 is of generally rectangular outer configuration with a bottom end wall 82a, side walls 82b and 82c, a top end wall 82d, and a back wall 82e. The front face of the side and end walls of case 82 are provided with a relatively narrow ridge 82f running around the inside perimeter of the front opening cavity in the case. Adjacent the upper end of the side walls 82b and 82c semi-circular bosses 82g with tapped screw receiving opening 82h are provided. Similar tapped screw receiving openings 80c are provided in base 80 in longitudinal alinement with the openings 82h. As best shown in FIG. 11, cover 84 seats against the front edge of case 82 with side flanges overlying the ridges 84f of cover 84 to provide dust tight closure of case 82. Cover 84 is screwed to base 80 and case 82 by screws (not shown) which penetrate openings in the cover and take down into the tapped openings 80c and 82h in base 80 and case 82.

Terminals T1 and T2 are threaded and take down into metal inserts 86 molded in place in the top end wall 82d of case 82. Terminal T1 interiorly of case 82 has threaded engagement with the bus 72, and terminal T2 has similar connection with the bus 76. A generally rectangular insulating terminal block 88 extends through a clearance opening in the top end wall 82d. Block 88 has a rubber sealing grommet 90 which is adapted to grip wires which penetrate the same with pin type terminations. While not shown, block 88 may be assumed to have terminal receptacles which grip the wire pin terminals, a preferred form which is shown in the Johnson Pat. No. 3,110,093.

Block 88 is molded in situ with the molded epoxy case 18a of logic unit 18. All of the circuitry enclosed by the dotted line rectangle designated 18 in FIG. 1 is embedded within unit 18a. Terminal T1 is connected by an insulated wire 93 to terminal T4 within case 18a. Terminals T5 and T11 through T13 shown in FIG. 1 may be assumed to be connected to pin terminal receptacles in block 88, and terminals T6 through T10 have, as will hereinafter be more fully explained in connection with FIG. 8, connection with conductors on a flexible printed circuit wiring harness 92.

An electromagnetic operating mechanism best shown in FIGS. 5, 7, 10, 12 and 15 is mounted within case 82 against the inside of the wall 82a. This operating mechanism has a magnet frame comprising a bottom plate 94 formed of electromagnet iron, coil core members 96 and 98, preferably formed of a vanadium permendur metal, and control permanent magnet member 100 preferably formed of an Alnico V metal. Plate 94 overlies thermistor TH and is secured in place by screws (not shown) that penetrate alined openings in the base 80 and bottom wall 82a of case 82 and take into threaded openings in plate 94. The cores 96 and 98 interfit in openings in the plate 94. As best shown in FIG. 16, the coils 26 and 30 actually each comprise separate concentrically wound pairs 26a and 26b, and 30a and 30b. The inner coils 26a and 30a are positioned adjacent the cores 96 and 98, and the coils 26b and 30b are positioned concentrically about the coils 26a and 30a respectively.

As best shown in FIGS. 12 and 16, the aforementioned parts of the armature assembly are held in assembled relation by a metal retainer 102 that fits over the end of the cores and permanent magnet member. Retainer 102 has suitable openings with upturned and downturned flange segments to frictionally grip the outer wall of the cores and member 100. On opposite sides of its central opening retainer 102 is provided with upstanding cylindrical pins 102a which center and restrain armature 56 against lateral movement. Armature 56, which is preferably formed of an electromagnet iron, has depending lugs or ears 56a and 56b formed centrally on opposite sides thereon. These ears, as best shown in FIG. 10, have U-shaped notches in which fit the pins 102a.

It is a feature of the present invention that in effecting operation of armature 56 from its full line position to its broken line position in FIG. 16, and vice versa, the outer coil about the core to which the armature is initially engaged and the inner coil about the core to which the armature is to be pivoted are electrically energized in parallel. That is to say, in pivoting armature 56 from its full line position to its broken line position in FIG. 16, coils 26a and 30b are energized in a parallel circuit, and in pivoting from the latter position back to its full line position, the coils 30a and 26b are energized in parallel. The concentric coils about each core are oppositely wound or differentially energized so that their generated electromagnetic fluxes are in opposition.

After the armature has attained its new position, the aforementioned operation of the cutthroat contact 28 or 32, as the case may be, deenergizes the previously energized coils. Then the retentive effect of permanent magnet member 100 magnetically latches armature 56 in either of its positions shown in FIG. 16. The subsequent energization of the outer coil (26b or 30b) about the core to which the armature is then latched produces an electromagnetic flux which bucks the retentive flux produced by permanent magnet 100. The simultaneous energization of the inner coil (26a or 30a) associated with the core against which armature 56 is to be pivoted will be effective to pivot the latter without having to overcome the retentive latching effect of permanent magnet 100.

Lever 58 is provided with a V-shaped off-set 58a which seats in a complementally formed bearing notch 56a in armature 56. A retainer clip 104 holds lever 58 in the bearing notch 56a and permits lever 58 to pivotally move thereon. A screw 106 threaded in an opening in lever 58 and engageable with the upper surface of armature 56 serves as an adjustable limit stop for counterclockwise pivotal movement of lever 58 relative to armature 56. As best shown in FIGS. 5 to 7 and 11, a member 108 screwed to the inside of the back wall 82e of case 82 as by a screw 110 penetrating an opening in such wall serves as a clockwise pivotal stop for lever 58.

Figure 6:
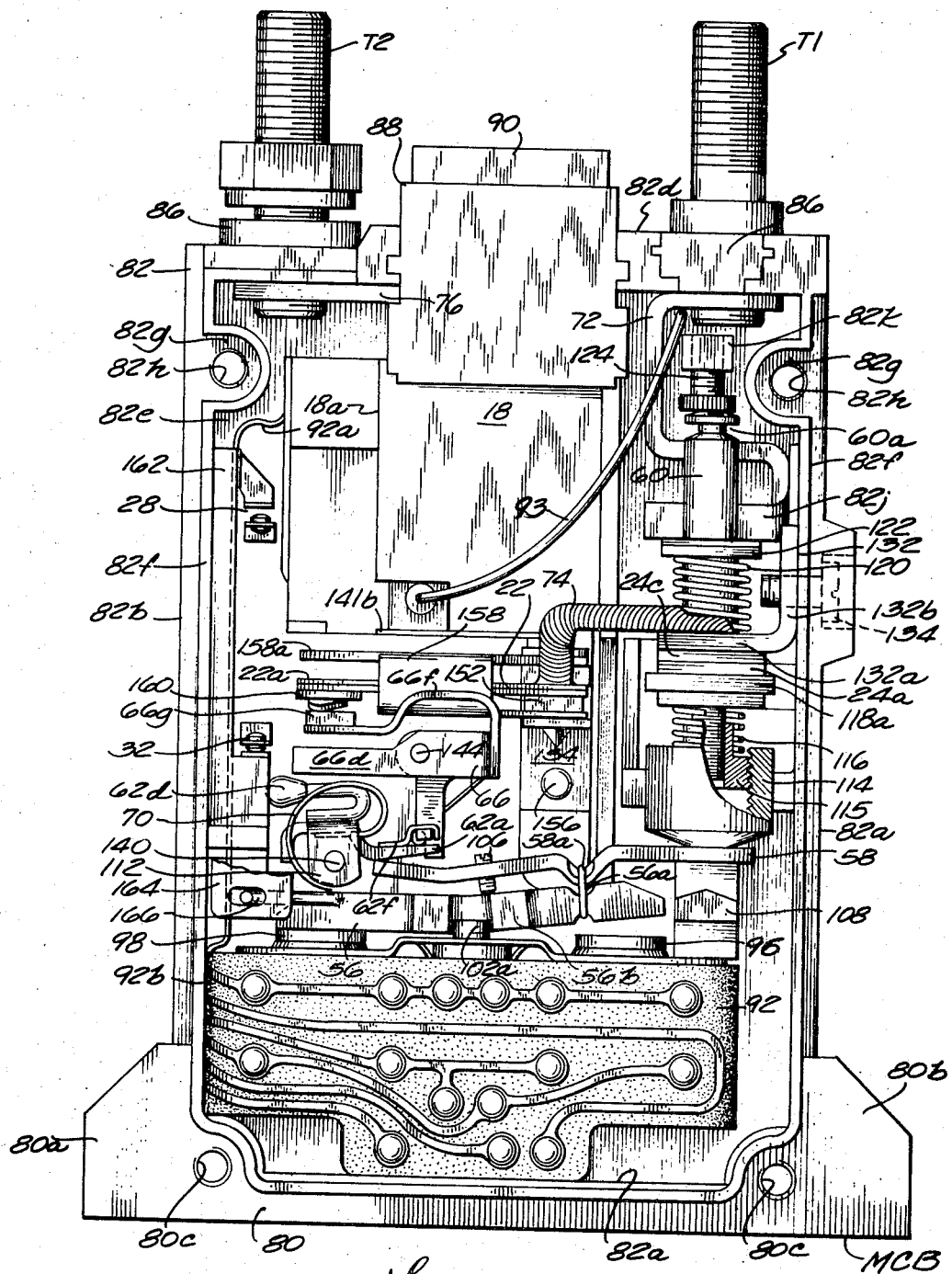
Figure 7:
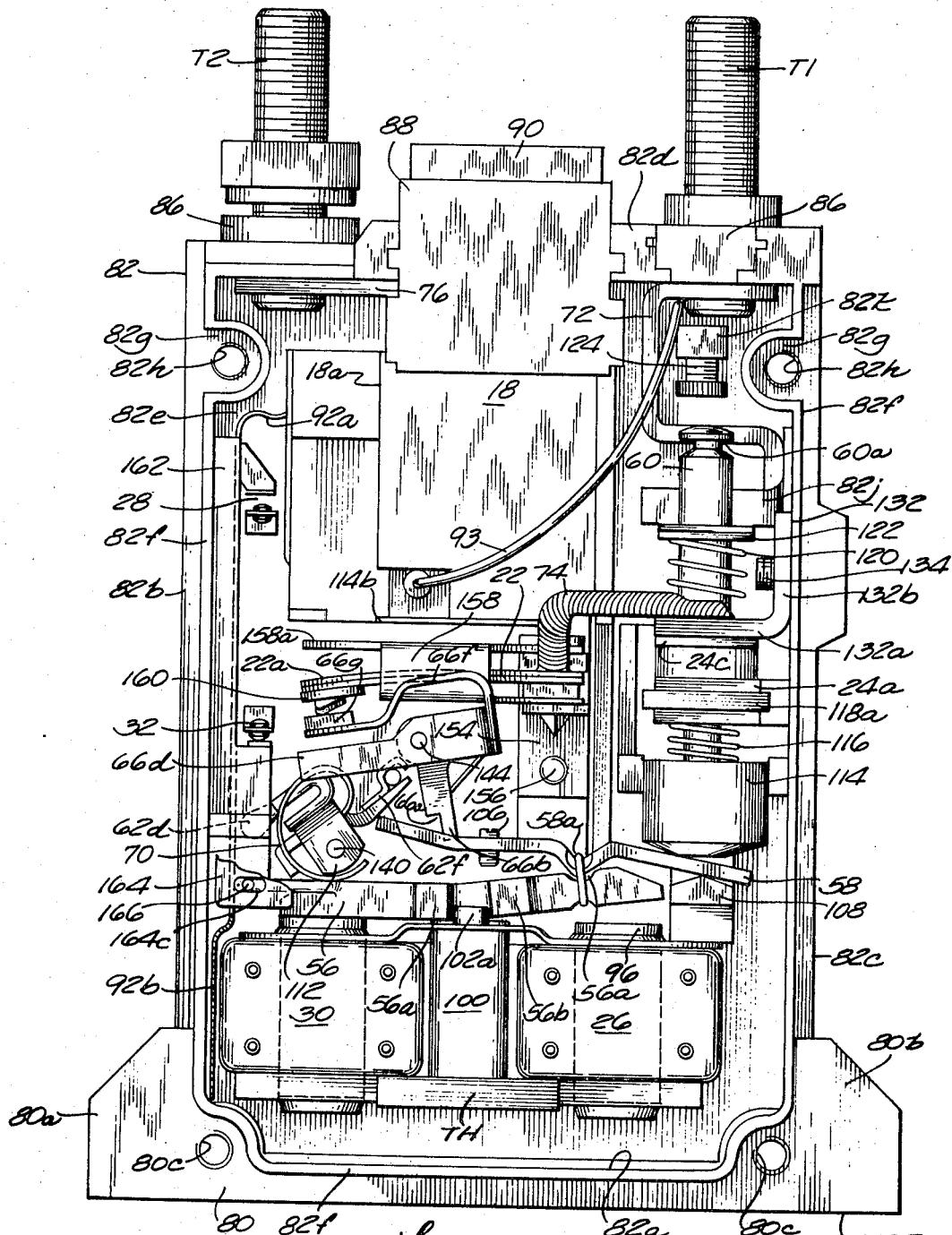

At its left-hand end, as viewed in FIGS. 5 to 7, lever 58 engages on its upper surface with the arm 62a of a latch lever 62, and adjacent its right-hand end engages the lower end of an adjustable, cup-shaped guide member 114, to which interiorly thereof, contact operating plunger 60 is threadedly attached to an adjusting nut 115. A compression spring 116 is disposed concentrically about plunger 60 and seats at its lower end against the upwardly facing shoulder of nut 115—see FIG. 11. Spring 116 at its upper end sets on the downwardly facing shoulder 118a of an insulating member 118 to which the movable contactor 24a of main power contacts is attached. Member 118 also has an upper cup-shaped recess 118b, and the lower end of another compression spring 120 disposed about plunger 60 seats within such recess 118b against a washer 119. The upper end of the spring 120 seats against a washer 122 that bears against a stop bracket 82j integrally formed with and extending frontwardly from the back wall 82e of case 82.

The upper end of plunger 60, in closed position of main contacts 24 as shown in FIG. 6, engages with an adjustable screw stop 125 threaded into a forwardly extending bracket 82k molded integrally with the back wall 82e of case 82. Plunger 60 adjacent its upper end is provided with an annular groove 60a, and as best shown in FIG. 11, the lower arm 126a of an L-shaped lever, preferably formed of spring wire, is attached by looping around plunger 60 within the groove 60a. A pivot bearing 126c is formed by a 540° looping of the wire between the lower arm 126a and the upper arm 126b. The bearing portion 126c is supported on a pivot pin supported in alined openings in spaced bracket portions 84a formed integrally on the inner surface of cover 84. At its upper end, the arm 126b engages within a recess 128a in a slidable indicator member 128 which has tongue and groove sliding engagement in portions bordering an opening 82k in the top wall 82d of cave 82. The upper side of the opening 82k is provided with a plastic transparent window 130 that overlies the indicator 128. On its upper side indicator 128 is provided with suitable indicia, such as "OPEN" and "CLOSED." Thus when indicator 128 is in the position shown in FIG. 11, the legend "OPEN" is visible through the window 130 to provide an indication that the main contacts of the circuit breaker are in open condition.

Main contacts 24a, in addition to contactor 24, include the stationary contacts 24b and 24c. Contact 24b, as best shown in FIG. 11, is attached to the lower arm 72a of the bus 72, and as best shown in FIGS. 5 to 7, contact 24c is attached to the arm 132a of an L-shaped bracket 132 which has its other arm abutting against the inner surface of side wall 82c of case 82. A screw 134 penetrating a clearance opening through a boss portion formed on the outer surface of case wall 82c secures the contact bracket 132 in place. A similar screw (not shown) to the rear of the screw 134 threads into the bus 72 to secure the same adjacent the point where contact 24b is mounted on arm 72a.

FIG. 5 shows the armature and main contact assemblies in their respective positions when the contactor 24a is disengaged from the stationary contacts 24b and 24c. The force exerted by the springs 116 and 120 bias plunger 60 downwardly so that the insulating member 118 and contactor 24a are also moved to their downward extreme limits. When the armature 56 is operated from the position shown in FIG. 5 to that shown in FIG. 6, lever 58 is constrained to the left of its pivot point on armature 56 by engagement with the arm 62a of latch lever 62. Accordingly, armature 56 and lever 58 will pivot counterclockwise and the right-hand end of lever 58 bearing on the lower end of guide member 114 will cause the latter, plunger 60 and the movable contactor assembly to move upwardly against the bias of return spring 116 and wear allowance spring 120 to close contactor 24a to stationary contacts 24b and 24c.

As will hereinafter be more fully described, when the armature is in its FIG. 6 position and an electrical overload occurs, latch lever 62 is unlatched to move on a pivot pin 140, and as a result lever 58 is then free to pivot clockwise under the downward bias exerted on it through the guide member 114, and other elements of the movable contactor operating assembly. Thus, contactor 24a disengages from contacts 24b and 24c as shown in FIG. 7.

As best shown in FIG. 10, latch lever 62 in addition to arm 62a, which is bifurcated adjacent its free end, has an integrally formed channel-shaped portion 62b with parallel legs 62c. The legs 62c have alined openings affording journaling of the portion 62b on the stationary pivot pin 140 which is supported on the portion 141a of a plate 141 (FIG. 13) abutting against the inside of the back wall 82e of case 82. An actuator arm 62h having an insulating tip 62d covering its free end, is secured to the upper surface of the portion 62b as by welding. A cylindrical pin 62e transversely straddles the bifurcated ends of the arm 62a and so loosely constrained within a formed metal cage 62f so that it can readily roll therein about its longitudinal axis, and thus provide a relatively friction-free latching surface for engagement with the notched end 66a of an arm 66b of a latch 66. Spring 70 which is generally C-shaped is secured at upper end to the lower surface of portion 62b and is engageable adjacent its lower end portion with armature 56.

Latch arm 66 is integrally connected with an arm 66c which is parallel with another arm 66d with which it is interconnected by a bight portion 66e. The arms 66c and 66d have alined openings provided for journaling of the latch on a stationary pivot pin 144 secured to the portion 141a of plate 141 on the back wall of the case 82 (FIG. 13). A bimetal portion 66f is welded to the bight portion 66e and at its free end has an insulating pad 66g attached to its upper surface. A torsion spring 146 (FIG. 14) which is coiled about an anchored at its inner end to pin 144 engages at its other end with the arm 66c of the latch, biases the latch for clockwise rotation on pin 144 as viewed in FIGS. 5 to 7. Normally, as shown in FIGS. 5 and 6, the notched end 66a of the latch engages the pin 62e of the latch lever 66 to hold the latter in the position shown. When the bimetal portion is pushed downwardly, due to heating of a bimetal assembly now to be described, latch 66 is pivoted against the bias of the spring 146 to disengage from the pin 62e and allow the latch lever 62 to pivot counterclockwise under the force exerted on it by lever 58 under overload conditions. Latch lever 62 in so pivoting causes engagement of its insulated tip 62d with the movable contactor OLT1. This overload trip contacts OLT to close the latter against stationary contact OLT2—see FIG. 8.

As best shown in FIGS. 5 to 7, and 13, cable 74, which is preferably formed from braided strands of copper wire, is brazed at one end to contact bracket 132, and at its other end to the upper surface of a bimetal member 22. Member 22 as shown in FIG. 13 is generally U-shaped and is attached by a screw 150 to an inverted L-shaped bracket 152. Bracket 152 overlies a similar inverted L-shaped bracket 154. The brackets 152 and 154 have their downwardly depending parallel legs secured to the portion 76a of bus 76 by a screw 156 which penetrates alined threaded openings therein and through the rear wall 82e of case 82.

A heat shield 158 has a lower arm that is sandwiched between the outwardly depending parallel arms of the brackets 152 and 154 and is secured thereto by the screw 150. As best shown in FIGS. 13 and 14, the shield 158 is U-shaped in elevation and has a main portion 158a that is spaced from an overlying bimetal member 22. Shield 158 serves to prevent heat generated in member 22 from flowing upwardly to the case 18a of logic unit 18. The plate 141 at its upper end is bent at a right angle and has a portion 141b extending toward the front of case 82 in continuous contact with the bottom of the case 18a of logic unit 18. The plate 141 also has an integral lower portion 141c that engages with bottom plate 94 of the electromagnet assembly. Thus plate 141 in addition to providing support for the pivot pins 140 and 144 serves as a heat shunt, to conduct heat away from the logic unit 18 and dissipate it in the relatively large mass of metal in the electromagnetic assembly.

As shown in FIGS. 13 and 14, a second bimetal member 160 is secured along its upper end on the lower surface of the bight 22a of a bimetal member 22. The lower arm 160a of member 160 overlies the insulating pad 66g on the bimetal arm 66f of latch 66. The bimetal members 22 and 160 together form an electro-thermally responsive trip for the latch 66. Upon overload current flow through members 22 and 160, they warp downwardly and the arm 160a engages arm 66f on the pad 66g to cause latch 66 to pivot clockwise as viewed in FIGS. 5 to 7 and disengage from the pin 62e on latch lever 62 to permit the latter to pivot counterclockwise and close switch OLT.

After the overload has subsided and bimetal members 22 and 160 have returned to their normal positions, operation of armature 56 from its FIG. 7 to FIG. 5 position will result in resetting of the latch. In pivoting clockwise the upper surface of armature 56 engages the lower portion of the spring 70 on the latch lever 62, and causes the latter to pivot clockwise and bring its latch pin 62e into engagement with the notch 66a of latch 66 which is then biased by the spring 146 for clockwise rotation. The bimetal arm 66f when heated warps downwardly as do the bimetal members 22 and 160. Arm 66f provides ambient temperature compensation for the bimetal thermal trip mechanism.

As shown in FIG. 8, the overload trip contacts OLT and cutthroat contacts 28 and 32 are mounted on the flexible printed circuit strip 92 which at their points of mounting is backed by a flat insulating board 162. The contactor OLT1 is attached at one end by a rivet to strip 92 and board 162, and its stationary contact OLT2 is similarly secured thereto. Contactor OLT1 is formed of a strip of spring metal and is normally biased against a stop pin 164 out of engagement from the contacts OLT2. As aforementioned, the engagement of the tip 62d of latch lever 62 on overload trip with OLT1 caused the latter to be closed to contact OLT2.

The cutthroat contacts 28 and 32 have contactors 28a and 32a formed of strips of spring metal and stationary contacts 28b and 32b that are all riveted to the strip 92 and board 162 in the same manner as for the overload trip contacts. However, the contactors 28a and 32a are normally biased into engagement with their associated stationary contacts 28b and 32b respectively.

As shown in FIG. 8, the printed circuit strip 92 has all the electrical circuitry embossed thereon that is necessary to effect the electrical interconnections shown in FIG. 1. At the right-hand side thereof, coils 26a, 26b, 30a and 30b, rectifiers 36 and 38 and thermistor TH have electrical connection and as aforementioned terminals T6 through T10 have electrical connection with conductors on strip 92 at the left-hand side of the strip.

As best shown in FIG. 9, in its assembled position in case 82, the strip 92 is folded at 92a adjacent the case 18a of logic unit 18 and lies between the inside rear wall 82e of case 82 and the adjacent surface of logic unit 18. The support board 162 and the portion of strip 92 immediately above, over and below are positioned on the inner surface of side wall 82b of case 80 with the contactors OLT1, 28a and 28b extending at a right angle to the rear wall 82e. Strip 92 is folded at 92b adjacent its attachment with the coils, rectifier and thermistor of the electromagnet.

A contact operating member 164 formed of a flat strip of insulating material overlies the contactors 28a and 32a and has rectangular apertures 164a and 164b to receive the free ends of such contactor therein. Member 164 also has an aperture 164c in which fits the free end of a bent wire member 166 which is attached at the left-hand end of the upper surface of armature 56 as best shown in FIG. 10. Member 164 is moved from its upward extreme position shown in FIG. 5 to a downward extreme position shown in FIG. 6 by armature 56 and wire member 166. In its upward extreme position member 164 holds contactor 28a closed to contact 28b, and holds contactor 32a out of engagement from contact 32b, and in its downward position member affords the reverse condition of the contactor 28a and 32a.

The hereinbefore described remote main circuit breaker MCB, inclusive of breaker mechanism 16 and logic unit 18, has been assumed to be connected for closing and opening an A.C. main power circuit and responding to an overload occurring therein. However, it is to be understood that it is designed and will operate just as satisfactorily when its terminals T1 and T2 are connected in a 28–32 volt D.C. main power circuit. Moreover, if desired, its terminal T5 can be connected to one line of an A.C. auxiliary voltage source or a D.C. voltage source as desired. In the event A.C. is used for both main and auxiliary power sources, it is required that the separate sources connected to MCB be in phase correspondence.

What is claimed is:

1. An electrical circuit breaker for remote control operation, comprising:
    (a) main power contact means including a reciprocably movable member for effecting closing and opening said contact means and spring means biasing said member to a contact opening position,
    (b) electromagnetic operating means including a pair of parallel spaced apart coil means, an armature pivotally mounted between and movable from one to another of extreme pivotal positions by selective energization of said coil means, and a lever pivotally mounted on said armature and engaging said reciprocably movable member adjacent one end thereof,
    (c) overload trip contact means including a movable contactor biased to contact open position,
    (d) a pivotally mounted latch lever normally engaging said armature mounted lever adjacent the other end of the latter and having a latch engaging portion,
    (e) a pivotally mounted latch including means normally biasing it into engagement with said latch lever to latch the latter against the aforementioned pivotal movement by said armature lever, and
    (f) bimetal means in circuit with the main power contacts and subjected to the current flowing through the latter and when subjected to overload current warping to pivot the latch against the bias of its biasing means to disengage it from the latch lever and allow the latter to pivot under the bias of said spring means and thereby open said main power contact means and close said overload trip contacts.

2. The combination according to claim 1 wherein said latch engages portion of said latch lever in a pin which is free to roll about its longitudinal axis but constrained against substantial longitudinal or transverse movement, and said latch has an arm with a notched shoulder which engages with said pin.

3. The combination according to claim 2 wherein said latch additionally has an arm formed of bimetal that is engaged by said bimetal means when the latter warps under current overload, said bimetal arm warping in the same direction under ambient heating to provide temperature compensation.

4. The combination according to claim 1 together with normally closed cutthroat contacts in circuit with each of said coil means, and a member carried by said armature to open one of said cutthroat contacts when said armature is operated to one extreme position and to open the other of said cutthroat contacts when said armature is operated to its other extreme position.

5. The combination according to claim 4 together with electronic means in circuit with said overload trip contact means and said cutthroat contact means, and a remote pilot circuit breaker in circuit with said electronic means and operable between open and closed positions to cause said electronic means to afford selective energization of said coil means, said electronic means upon closure of said overload trip contacts subjecting said pilot circuit breaker to a controlled value of current that causes the latter to trip to open condition.

6. The combination according to claim 5 wherein said electronic means includes a thermistor which is included in circuit with said pilot circuit breaker following closing of said overload trip contacts to automatically limit the circuit flow to the pilot circuit breaker to a value preventing overheating of said circuit breaker.

7. The combination according to claim 1 together with a C-shaped spring member secured at one end to said latch lever and following latch tripping engages with said armature adjacent its other end so that upon following operation of said armature to another extreme position force is transmitted therethrough to pivot said latch lever into latching engagement with said latch.

8. The combination according to claim 1 together with a generally L-shaped pivoted lever formed of spring wire having engagement with said reciprocably movable member adjacent one end, and a contact position indicator having engagement with the other end of said L-shaped member and being afforded movement by the latter transversely of the direction of movement of said reciprocably movable member.

9. The combination according to claim 1 together with an additional bimetal member secured to and extending at a right angle from the warp plane of said bimetal means and engaging the end of the bimetal arm of said latch.

10. The combination according to claim 1 wherein said electronic means is encapsulated in a module case, wherein a metal plate is provided which adjacent one end is in engagement with said module case and at its other end is engaged with magnetic circuit portions of said electromagnetic operating means to provide a metallic heat shunt therebetween, and wherein said metal plate carries the pivot fulcrum for said latch and latch lever.

References Cited

UNITED STATES PATENTS

| 3,594,668 | 7/1971  | Clarke     | 335—13  |
| 3,521,127 | 7/1970  | Shand      | 317—54  |
| 3,584,261 | 6/1971  | Anderson   | 317—132 |
| 3,483,432 | 12/1969 | Neill      | 317—58  |
| 2,895,028 | 7/1959  | Ellenberger| 337—54  |

HAROLD BROOME, Primary Examiner

U.S. Cl. X.R.

335—43, 169